Patented Sept. 12, 1933

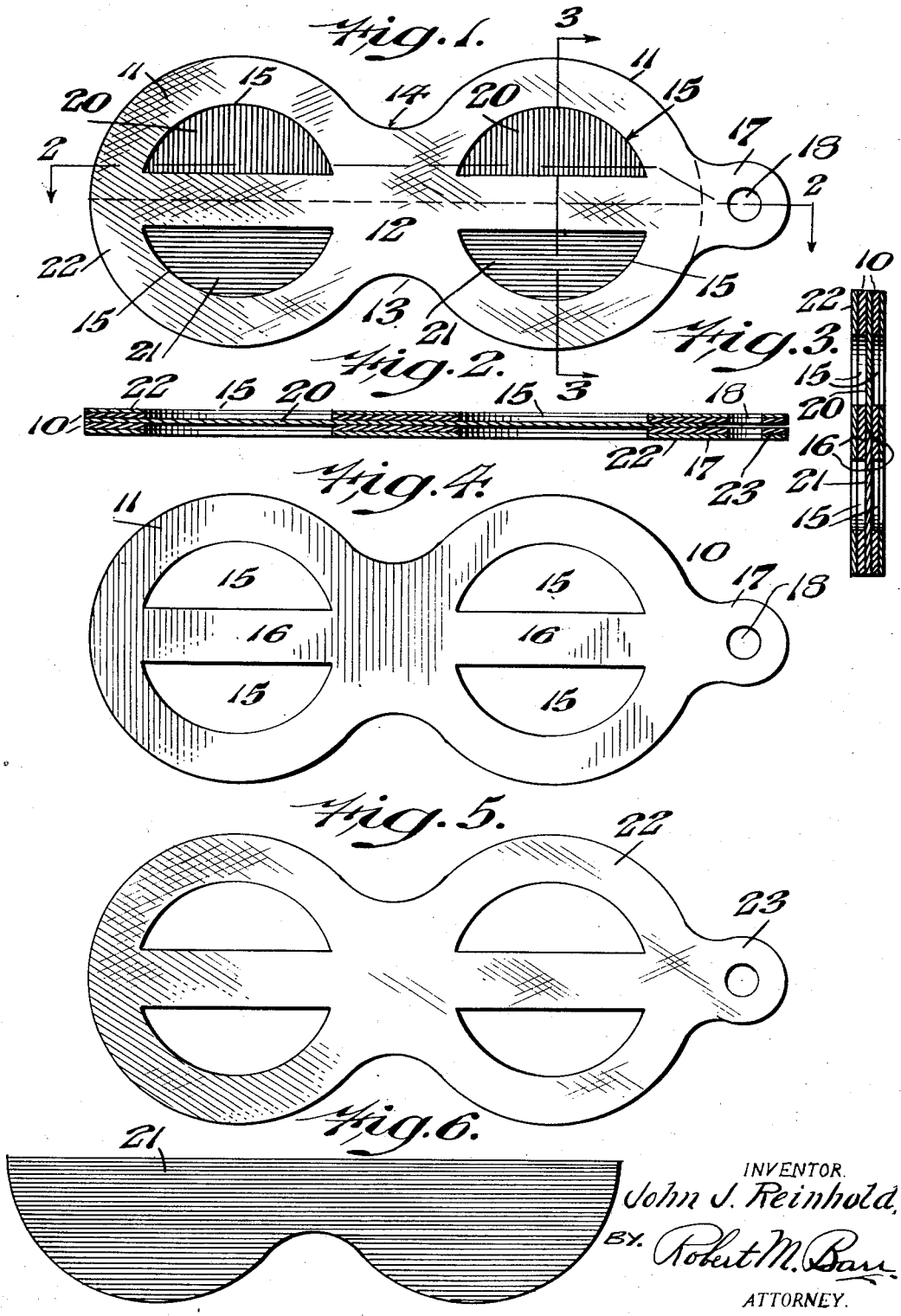

1,926,649

UNITED STATES PATENT OFFICE 1,926,649

ADVERTISING DEVICE

John J. Reinhold, Marietta, Pa.

Application October 21, 1931. Serial No. 570,145

5 Claims. (Cl. 88—41)

The present invention relates to advertising devices and more particularly to such a device in the form of an eyeglass novelty.

Some of the objects of the present invention are to provide an advertising medium which if desired can be so cheaply made as to be given away and at the same time serves a useful purpose; to provide a device in the form of an eyeglass which is so arranged and constructed as to produce different colored effects when in use; to provide a device wherein an advertisement appears in duplicate though singly visible to the user; to provide a viewing device wherein a plurality of colored effects can be obtained when looking through the device; to provide an eyeglass structure wherein the lens field is subdivided horizontally into two fields which are provided with lenses of contrasting color; to provide a mounting for lenses wherein the surface of the lens is below or set back from the plane of the face of the article and to provide other improvements as will hereinafter appear.

In the accompanying drawing Fig. 1 represents a front elevation of an eyeglass embodying one form of the present invention; Fig. 2 represents a section on line 2—2 of Fig. 1; Fig. 3 represents a section on line 3—3 of Fig. 1; Fig. 4 represents an elevation of one of the members which form the body of the device; Fig. 5 represents an elevation of one of the outer protecting members, and Fig. 6 represents an elevation of one of the colored lenses.

Referring to the drawing one form of the present invention consists of a body formed of two plates 10 of like configuration and each shaped to provide two substantially circular frames 11 which are interconnected by a bridge piece 12, the opposite edges of which are recessed to form nose receiving notches 13 and 14. It will thus be evident that the shape of the body members 10 is such that when held in a vertical plane before the eyes of a user either the notch 13 will rest upon the bridge of the nose to properly locate the axis of the frames in coaxial relation with the eyes of the user while if inverted and held in using position the notch 14 will similarly seat upon the bridge of the nose and allow the frames to be used in that position. The members 11 are preferably of opaque material having sufficient stiffness to maintain the shape of the article and each has four through openings 15 formed by cutting away the material in the form of segments of a circle so that the completed member has a horizontal axial strip 16 subdividing each pair of openings 15. The result of this construction is that there are two openings 15 provided in the upper half of the members and two openings 15 provided in the lower half of each member, and one or the other pair of openings can be looked through by the observer depending upon whether the members are in one position or another.

It should be noted that the rim of the frames 11 namely the part which bounds the openings 15 is relatively wide and this serves as a concentric field about the openings having suitable proportions for displaying an advertisement. This advertising area is further enlarged by the horizontal dividing strip 16 which thus serves the dual function of displaying an advertisement and also subdividing the pairs of openings 15.

In order to grasp the members 10 for holding them in viewing position each is provided with an end strip 17 which is provided with an aperture 18 in order that the thumb or finger of the user can obtain a firm grasp upon the tab when using the device.

In the form of the invention here shown by way of example a strip 20 of transparent material, red in color, is arranged to be mounted between the two members 10 in such a position as to cover the area of the upper pair of openings 15. Likewise a second strip 21 of transparent material, blue in color, is also mounted between the members 10 and in the plane of the strip 20 so that it covers the lower pair of openings 15. The two members 10 are assembled with the two strips 20 and 21 between them so that all four members are glued or otherwise permanently fastened together with the color strips in position to cover the openings 15.

Both sides of the completed device are alike as to configuration but may bear different advertisements and as each is exposed to handling in use, it has been found desirable to provide two cover plates 22 which preferably conform in shape and size to the members 10 and are made of celluloid or some other suitable transparent material through which the advertisements can be seen when the cover plates 22 are permanently fastened in place. As here shown the cover plates also respectively have tabs 23 to conform to and form part of the handling tab of the members 10. Preferably also the two cover plates 22 are amber colored as this more clearly delineates the contrast of the advertising material.

In use the device is held by the tabs 17 in a horizontal position with one or the other of the nose notches 13 or 14 resting upon the bridge of the nose so that the lower pair of openings 15 are respectively opposite the eyes of the user and if the blue strip is before the eyes the scenic effect will be of a character produced by looking through blue glasses while if inverted a different effect will be produced because of the interposition of the red strip or lens. Since the device is to be inverted to change from one pair of openings to the other, that is from one color to another, the second advertisement is immediately brought to the notice of the user and the device becomes doubly effective as an advertising medium.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. An advertising medium comprising a body in the form of an eyeglass frame providing areas for advertising on both faces thereof, means subdividing each frame into two upper and two lower openings, a colored lens over the upper openings, a lens of different color over the lower openings, and two nose receiving notches arranged respectively at opposite sides of the long axis of said body and each spaced therefrom so as to position only one pair of openings at a time in front of the eyes of the user.

2. An advertising medium comprising a body of eyeglass shape formed of two superposed members provided with sight openings and having areas for advertising encircling said sight openings, strips of different colored transparent material clamped between said members, an opaque strip disposed horizontally across said openings to separate one color strip from the other along the longitudinal axis of said body, two transparent covers on the outer face of each body member, and means to secure said covers permanently in place.

3. An advertising medium comprising a body in the form of an eyeglass frame providing areas for advertising on both faces thereof, and having two pairs of openings therethrough arranged in superposed relation, a colored transparent strip in one pair of said openings, a transparent strip of different color in the other pair of said openings, means mounting said strips in the same plane but in a plane parallel to the planes including the respective sides of said body, and means to position said eyeglass frame on the face of the user so that only one pair of openings at a time can be used for viewing purposes.

4. An advertising medium comprising a body in the form of an eyeglass frame providing areas for advertising on both faces thereof, and having two pairs of openings therethrough arranged in superposed relation, a colored transparent strip in one pair of said openings, a transparent strip of different color in the other pair of said openings, means mounting said strips in the same plane but in a plane parallel to the planes including the respective sides of said body, and a separate nose notch for each pair of openings arranged in said body so that only one pair of openings at a time can be used for viewing purposes.

5. A viewing device comprising a body formed of transparent material of two contrasting colors, a strip arranged to receive advertising matter secured to said body and subdividing the colors of said transparent material along the longitudinal axis of the body, and nose notches cut in said transparent material respectively at opposite sides of said strip, the said parts forming a viewing device reversible about the strip as a longitudinal axis and presenting but one colored portion of said transparent body to the eyes of the user when in operative position.

JOHN J. REINHOLD.